United States Patent
Kumaraswamy et al.

(10) Patent No.: US 10,487,190 B2
(45) Date of Patent: Nov. 26, 2019

(54) MACROPOROUS OMNIPHILIC SPONGES

(71) Applicant: Council of Scientific & Industrial Research, New Delhi (IN)

(72) Inventors: Guruswamy Kumaraswamy, Pune (IN); Soumyajyoti Chatterjee, Pune (IN); Sayam Sen Gupta, Pune (IN)

(73) Assignee: Council of Scientific & Industrial Research, New Delhi (IN)

( * ) Notice: Subject to any disclaimer, the term of this patent is extended or adjusted under 35 U.S.C. 154(b) by 200 days.

(21) Appl. No.: 14/953,811

(22) Filed: Nov. 30, 2015

(65) Prior Publication Data

US 2017/0145179 A1    May 25, 2017

(51) Int. Cl.
*C08J 9/26* (2006.01)
*C08J 9/36* (2006.01)

(52) U.S. Cl.
CPC . *C08J 9/36* (2013.01); *C08J 9/26* (2013.01); *C08J 2201/048* (2013.01); *C08J 2305/08* (2013.01); *C08J 2329/04* (2013.01); *C08J 2379/02* (2013.01)

(58) Field of Classification Search
CPC . C08J 9/26; C08J 9/36; C08J 2201/048; C08J 2329/02; C08J 2329/04
See application file for complete search history.

(56) References Cited

U.S. PATENT DOCUMENTS

| | | | |
|---|---|---|---|
| 5,002,984 A | 3/1991 | Rainer | |
| 5,599,916 A * | 2/1997 | Dutkiewicz | A61L 15/28 536/20 |
| 5,690,996 A * | 11/1997 | Sanderson | C08B 15/005 264/217 |
| 6,306,488 B1 | 10/2001 | Rainer | |

FOREIGN PATENT DOCUMENTS

| | | | |
|---|---|---|---|
| JP | H10237213 | * | 9/1998 |
| KR | 20100009305 A | * | 1/2010 |

OTHER PUBLICATIONS

Definition of "Compressible." Merriam-Webster online dictionary. (Year: 2018).*
Haitao Zhu et al.. "Evaluation of Electrospun Polyvinyl Chloride/ Polystyrene Fibers ss Sorbent Materials for Oil Spill Cleanup", *Environmental Science and Technology*, No. 45 (2011), p. 4527-4531.
Yanxiong Pan et al., "Evaluation of Hydrophobic Polyvinyl-Alcohol Formaldehyde Sponges as Absorbents for Oil Spill", *ACS Applied Materials & Interfaces*, No. 6 (2014), p. 8651-8659.

* cited by examiner

*Primary Examiner* — Kara B Boyle
(74) *Attorney, Agent, or Firm* — Haug Partners LLP; William S. Frommer (57) ABSTRACT

The present invention discloses a versatile, macroporous, omniphilic polymeric sponges for absorption of organic liquids of varying polarity as well as water. Particularly, disclosed herein is an ice-templated macroporous omniphilic polymeric sponge as inexpensive versatile absorbents.

7 Claims, 5 Drawing Sheets

MACROPOROUS OMNIPHILIC SPONGES

FIELD OF THE INVENTION

The present invention relates to macroporous, omniphilic sponges. Particularly, the present invention relates to versatile, macroporous, omniphilic polymeric sponges for absorption of both organic liquids of varying polarity as well as water. More particularly, the present invention relates to ice-templated macroporous omniphilic polymeric sponges as versatile absorbents.

BACKGROUND AND PRIOR ART OF THE INVENTION

Oil spills in the ocean cause a major threat to environment and is a serious problem. Failure to control the spilled oil can lead to contamination of miles of shorelines creating adverse impact on the flora and fauna and invariably on the human life. Similarly, the leakages of hazardous liquid chemicals in laboratory or in an industrial setting can also be equally dangerous and therefore need to be wiped out completely. Further, the water bodies such as lakes, rivers, ponds as well as soil in agricultural lands contaminated with oils, lipophilic substances, other toxic chemicals also pose an environmental threat and has to be addressed to control the pollution.

There are many ways to remove oil or other chemical spills such as use of surfactants, dispersants, liquid soaps or use of activated carbon. The use of these technologies have certain limitations such as the treatment with activated carbon in granular form is confined within the vessel in the form of bed which might create impedance to the flow of water, the granules may also trickle down in the water and there is a need for further filtration which requires the use of suitable membranes that makes the process costly. The use of liquid soap is limited as it is unable to effectively remove any form of the contaminant. The effective use of surfactants and dispersants depend on the environmental factors including the salinity and temperature of water, nature of oil spilled etc.

Absorbent foams are the alternative techniques used in the removal of pollutants. The polyurethane foams are widely used in the removal of oil, however, the hydrophobic nature of the foam restricts its use to removal of hydrophobic liquids from the mixture of hydrophobic and hydrophilic liquids. Further, the polyurethane material is often attacked by oil causing swelling of the material resulting in drastic impairment in the mechanical properties. Modification of hydrophobic foams by coating or inserting lipophilic or hydrophilic material is known in the art, however, the materials lack the mechanical stability and limits its use.

Macroporous sponges with high surface area and interconnected pores have attracted much attention recently for removing oil or hazardous chemicals from the surfaces of water bodies. An article titled 'Evaluation of hydrophobic polyvinyl-alcohol formaldehyde sponges as absorbents for oil spill' by Pan Y, Shi K et. al published in ACS Appl Mater Interfaces. 2014 Jun. 11; 6(11):8651-9 discloses macroporous and hydrophobic polyvinyl formaldehyde (PVF-H) sponges prepared by the reaction of stearoyl chloride with hydroxyl groups of hydrophilic PVF sponge at different temperatures. The as-prepared PVF-H macroporous sponges have interconnected open-cell structures, with the average pore size from 60 to 90 μm and porosity greater than 94.8%. Such PVF-H sponges absorb oil products such as toluene, n-hexane, kerosene, soybean oil, hydraulic oil, and crude oil up to 13.7 g·g (−1) to 56.6 g·g (−1).

Article titled 'Evaluation of Electrospun Polyvinyl Chloride/Polystyrene Fibers As Sorbent Materials for Oil Spill Cleanup' by Haitao Zhu et. al published in Environ. Sci. Technol., 2011, 45 (10), pp 4527-4531 disclose high-capacity oil sorbent consisting of polyvinyl chloride (PVC)/polystyrene (PS) fiber prepared by an electrospinning process. The PVC/PS sorbent exhibits high absorptivity of organic solvents such as motor oil, peanut oil, diesel and ethylene glycol.

U.S. Pat. No. 5,002,984 discloses an insolubilized polyethyleneimine (PEI) polymer deposited in situ within an open celled cellulosic sponge. The insolubilized PEI is prepared by initially forming a water solution of PEI and an insolubilizing co-reactant, applying said solution to a cellulosic sponge, drying the treated sponge to remove water of solution, followed by curing the sponge at temperature in the range of 130° C.-165° C. The cellulosic sponge of US'984 is used for the water treatment as ion-exchange resin.

U.S. Pat. No. 6,306,488 relates to an open-celled sponge having a cellulosic component of large pore size and a polyvinylchloride component of small pore size for use in water filtration to absorb toxic heavy metals, sound absorption and thermal insulation. The average pore size of the coarse pore grade is about 2 mm and the average pore size of the fine pore grade is about 1 mm. The average diameter of said interstices ranges between 0.2 and 20 microns and the surface area of said microporous PVC is between 0.5 and 12 square meters per gram. The microporous PVC is produced by forming a mixture of a colloidal dispersion of a latex of a non-film forming PVC with a water-soluble organic non-solvent for the polymer, and subjecting the mixture to thermal curing. The mixture is then added to the cellulose sponge in dry form in controlled manner to attain proper saturation of the cellulosic sponge. The impregnated sponge is further subjected to heat treatment at temperatures in the range of 220° F. to 280° F. for a period of from 15 to 100 minutes to cause the dispersed polymer particles to cohere or sinter together, thereby forming a microporous structure within the pores of the cellulosic sponge. From the disclosure in said US'488, it is observed that the process to prepare the said sponge with desired characteristics varies with heating conditions and quantity of PVC introduced in the sponge.

Thus, there remains a need in the art to provide macroporous polymeric sponges that can absorb both organic fluids as well as water. For preparing macroporous absorbents, it is necessary to control the shape, size and interconnectivity to facilitate mass transport through the macrochannels with limited pressure drop. The methods disclosed in the art are tedious, require the use of costly chemicals and need selective conditions to be maintained throughout the process to obtain the specific architectures of the sponges. Thus a rational approach to provide polymeric sponges with desirable growth morphologies and pore structure is still a need of the art.

Ice-templating or freeze casting method has seen a surge of interest over the last decade. It is mostly based on physical interactions and mechanisms and the materials can be templated independently of their nature. The method involves the use of ice crystals as a template for the macro structures, with the ice-crystals being formed during the unidirectional freezing of an aqueous suspension containing the organic or inorganic solid particles that need to be assembled in the macrostructure. The ice-templating technique can be used to simultaneously control several different sizes in the material.

The commercially available absorbent material called Solusorb which is chemically activated charcoal is used in research laboratory or in industry to mop up spills. The material can absorb ~220 ml/kg of the solvents.

The present inventors observed that the absorbent materials known in the art and the process for preparing the same have certain shortcomings which need to be curtailed so as to provide a more versatile absorbent material i.e. sponges which have great affinity to both water as well as organic compounds, with enhanced absorptivity, useful for the control of spills/leakages. They were of the further opinion that the solvophilicity of the sponge can be tuned by grafting different chemical moieties on to the ice-templated hydrophilic polymeric material.

OBJECTS OF THE INVENTION

Main objective of the present invention is to provide macroporous, omniphilic sponges. Another objective of the present invention is to provide the versatile, macroporous, omniphilic polymeric sponges for absorption of both organic liquids of varying polarity as well as water.

Yet another objective of the present invention is to provide ice-templated macroporous omniphilic polymeric sponges as versatile absorbents.

A further objective of the present invention is to provide versatile macroporous polymeric sponges which are omniphilic and can rapidly absorb both organic fluids as well as water with enhanced absorptivity.

One more objective of the present invention is to provide ice-templating method for preparing ice-templated hydrophilic macroporous polymeric sponges and systematic modification of the same, to tune the solvophilicity of the sponge, by covalently coupling different chemical moieties on to said polymeric sponge.

Yet another objective of the present invention is to provide macroporous, omniphilic sponges which are mechanically stable and can be reused without deterioration.

SUMMARY OF THE INVENTION

Accordingly, the present invention relates to a macroporous omniphilic sponge, comprising;
i. a polymer with free amino or hydroxyl group or both;
ii. a cross-linker; and
iii. a modifying agent selected from aliphatic or aromatic epoxides, acid chloride, aldehyde or acids that tunes the solvophilicity of the sponges;
wherein the total volume of said macropores is between 60-95% of the geometric volume of said polymeric sponge, said sponge absorbs organic fluids of varying polarity and water more than 1.5 times the weight of the composition.

In an embodiment of the present invention, wherein the polymer is selected from group consisting of polyethyleneimine, poly-s-lysine, polyvinyl alcohol or chitosan.

In still another embodiment of the present invention, wherein the cross linkers are selected from the group consisting of multifunctional or at least bi-functional epoxides such as epichlorohydrin, 1,4-butanediol diglycidyl ether, ethylene glycol diglycidyl ether, polyethylene glycol diglycidyl ether, PEG diepoxide, polypropylene glycol diglycidyl ether, glycerol polyglycidyl ether and sorbitol polyglycidyl ether, preferably 1,4-butanediol diglycidyl ether; acid chlorides; aldehydes; carbodiimides such as 1-Ethyl-3-(3-dimethylaminopropyl)carbodiimide (EDC), N,N'-dicyclohexyl carbodiimide (DCC), N,N'-diisopropylcarbodiimide (DIC); isocyanates and such like that can form covalent bond with amino as well as hydroxyl group.

In an preferred embodiment of the present invention, wherein the modifying agent is selected from aromatic and C4 to C17 aliphatic epoxides, acid chloride, aldehydes or acids.

In yet another embodiment of the present invention, wherein the polymer and cross linker are in the ratio ranging from 1:1 to 10:1.

In another embodiment of the present invention, wherein the ratio of modifying agent: polymer+cross linker is in the range of 1:0.3 to 1.5:1.

In still another embodiment of the present invention, wherein said omniphilic sponge is stable to compression-expansion at 500 cycles.

In another embodiment of the present invention, wherein the process for producing macroporous, omniphilic polymeric sponge that can absorb both organic fluids of varying polarity as well as water more than 1.5 times the weight of the composition, comprising;
(i) providing ice-templating method comprising refrigerating the mixture of a polymer with free amino or hydroxyl group in water and a cross linker by maintaining the temperature at −15° to −20° C. for about 24 hours until a mesh is observed, thawed to obtain ice-templated hydrophilic cross linked polymeric sponge; and
(ii) covalently coupling the dried polymeric sponge of step (i) with a modifying agent selected from aliphatic or aromatic acid chloride, aldehyde, acids or epoxides or such like organic moieties to tune the solvophilicity of the sponge to obtain desired omniphilic sponge.

In yet another embodiment of the present invention, wherein, sponges is useful to control oil spills in water bodies or in laboratories or in an industrial setting by selective absorption of organic fluid of varying polarity as well as water.

In line with the above objectives, the present invention provides versatile, macroporous, omniphilic polymer sponges that are generated during ice-templating having potential to absorb both organic liquids of varying polarity as well as water more than 1.5 times the weight of the composition.

In an aspect, the solvophilicity of the sponges of the present invention are tuned by systematic modification of ice-templated hydrophilic polymer sponges by covalently coupling different chemical moieties on to said polymeric sponge.

The sponges of the present invention are stable and can be reused several times without deterioration.

DETAILED DESCRIPTION OF THE INVENTION

The invention will now be described in detail in connection with certain preferred and optional embodiments, so that various aspects thereof may be more fully understood and appreciated.

The term omniphilic sponges' used herein in the specification mean and refer to the sponges that have fairly high affinity for both organic liquids of varying polarity as well as water.

In an embodiment, the present invention relates to a versatile, macroporous, omniphilic polymeric sponge that can absorb organic fluids of varying polarity as well as water more than 1.5 times the weight of the composition, comprising;
i. a polymer with free amino or hydroxyl group or both;
ii. a cross-linker; and
iii. a modifying agent selected from aliphatic or aromatic epoxides, acid chloride, aldehyde, acids or such organic moieties that can tune the solvophilicity of the sponges; wherein the total volume of said macropores is between 60-95% of the geometric volume of said polymeric sponge.

The polymer is selected from amine containing polymers such as polyethylene imine (PEI) or poly-ε-lysine, from hydroxyl group containing polymers such as PVA (polyvinyl alcohol) or polysaccharides such as chitosan.

In an aspect, the polymer is selected from polyethyleneimine (PEI) with molecular weight of in the range of 2000-700,000, or from poly vinyl alcohol or chitosan.

The crosslinkers capable of cross linking the amine or hydroxyl functionality includes multifunctional or at least bi-functional epoxides such as epichlorohydrin, 1,4-butanediol diglycidyl ether, ethylene glycol diglycidyl ether, polyethylene glycol diglycidyl ether, PEG diepoxide, polypropylene glycol diglycidyl ether, glycerol polyglycidyl ether and sorbitol polyglycidyl ether, preferably 1,4-butanediol diglycidyl ether; acid chlorides selected from valeroyl chloride, nonanoyl chloride and palmitoyl chloride, preferably valeroyl chloride; aldehydes, carbodiimides such as 1-Ethyl-3-(3-dimethylaminopropyl)carbodiimide (EDC), N,N'-dicyclohexylcarbodiimide (DCC), N,N'-diisopropylcarbodiimide (DIC); isocyanates and such like that can form covalent bond with amino as well as hydroxyl group.

The amount of cross linker is in the range of 3 to 10 weight percent based on the amount of polymer.

The modifying agents for tuning the solvophilicity of the sponges are selected from aliphatic or aromatic epoxides, acid chloride, aldehyde, acids or such organic moieties. In a preferred embodiment, the modifying agents are aromatic and C4 to C17 aliphatic epoxides, acid chloride, aldehyde, acids or such organic moieties.

The composition comprises the polymer and cross linker in the ratio ranging from 1:1 to 10:1. The ratio of modifying agent: polymer+cross linker is in the range of 1:0.3 to 1.5:1.

In another preferred embodiment, the present invention discloses a versatile, macroporous, omniphilic polymeric sponge that can absorb organic fluids of varying polarity as well as water more than 1.5 times the weight of the composition, comprising;
  (i) Polyethyleneimine (PEI) polymer and 1,4-butanediol diglycidyl ether as cross linker, the weight ratio of said PEI to the cross linker is in the range 1.2 to 1.5
  (ii) Acid chloride selected from valeroyl chloride, as modifying agent in an amount of 0.5 to 0.8 mmol;
wherein the total volume of said macropores is between 60-95% of the geometric volume of said polymeric sponge.

In another embodiment, the present invention discloses a versatile, macroporous, omniphilic polymeric sponge that can absorb organic fluids of varying polarity as well as water more than 1.5 times the weight of the composition, comprising;

(i) Poly vinyl alcohol (PVA) polymer and PEG diepoxide as cross linker, the weight ratio of said PVA to the cross linker is in the range 1.2 to 1.5;
  (ii) Acid chloride selected from valeroyl chloride, as modifying agent in an amount of 0.5 to 0.8 mmol;
wherein the total volume of said macropores is between 50-95% of the geometric volume of said polymeric sponge.

In yet another embodiment, the present invention discloses a versatile, macroporous, omniphilic polymeric sponge that can absorb organic fluids of varying polarity as well as water more than 1.5 times the weight of the composition, comprising;
  (i) Chitosan polymer dissolved in 1% formic acid solution and glutaraldehyde as cross linker, the weight ratio of said PVA to the cross linker is in the range 1.2 to 1.5;
  (ii) Acid chloride selected from valeroyl chloride, as modifying agent in an amount of 0.5 to 0.8 mmol;
wherein the total volume of said macropores is between 50-95% of the geometric volume of said polymeric sponge.

In another embodiment, the present invention relates to a process for producing macroporous, omniphilic polymeric sponge, that can absorb both organic fluid of varying polarity as well as water, comprising;
  (i) providing ice-templating method comprising refrigerating the mixture of a polymer with free amino or hydroxyl group in water and a crosslinker by maintaining the temperature at −15° to −20° C. for about 20 to 24 hours until a mesh is observed, thawed to obtain ice-templated hydrophilic cross linked polymeric sponge; and
  (ii) covalently coupling the dried polymeric sponge of step (i) with a modifying agents elected from aliphatic or aromatic acid chloride, aldehyde, acids or epoxides or such organic moieties in presence of a base to tune the solvophilicity of the desired omniphilic sponge.

The polymer is selected from amine containing polymers such as polyethyleneimine (PEI) or poly-s-lysine from hydroxyl polymers such as PVA (polyvinyl alcohol) or polysaccharide such as chitosan.

In an aspect, the polymer is selected from polyethyleneimine (PEI) with molecular weight of in the range of 2000-700,000, or from poly vinyl alcohol or chitosan.

The crosslinkers capable of cross linking the amine or hydroxyl functionality includes multifunctional or at least bi-functional epoxides such as epichlorohydrin, 1,4-butanediol diglycidyl ether, ethylene glycol diglycidyl ether, polyethylene glycol diglycidyl ether, PEG diepoxide, polypropylene glycol diglycidyl ether, glycerol polyglycidyl ether and sorbitol polyglycidyl ether, preferably 1,4-butanediol diglycidyl ether; acid chlorides selected fromvaleroyl chloride, nonanoyl chloride and palmitoyl chloride, preferably valeroyl chloride; aldehydes, carbodiimides such as 1-Ethyl-3-(3-dimethylaminopropyl)carbodiimide (EDC), N,N'-dicyclohexylcarbodiimide (DCC), N,N'-diisopropylcarbodiimide (DIC); isocyanates and such like that can form covalent bond with amino as well as hydroxyl group. The base is selected from ethylamine, triethylamine, pyridine and such like; preferably triethylamine.

The modifying agents for tuning the solvophilicity of the sponges are selected from aliphatic or aromatic epoxides, acid chloride, aldehyde, acids or such organic moieties. In a preferred embodiment, the modifying agents are aromatic and C4 to C17 aliphatic epoxides, acid chloride, aldehyde, acids or such organic moieties.

In a more preferred embodiment, the modifying agents are selected from valeroyl chloride, palmitoyl chloride and nonanoyl chloride.

Accordingly, the fabrication of macroporous cross linked polymer sponge by ice-templating method includes mixing an aqueous solution of a polymer with free amino or hydroxyl group and a cross linker thoroughly by vortexing in a plastic tube and immediately transferring the tube to a refrigerator. The temperature of the refrigerator was maintained in the range −10 to −20° C. for about 20 to 30 hours. Subsequently, the crosslinked polymer sponge was carefully taken out from the plastic tube and was allowed to thaw at room temperature. Finally, the sponge was washed multiple times, using excess water to obtain the sponge which is hydrophilic.

The solvophilicity of the as prepared hydrophilic sponge was tuned by hydrophobization. In an aspect of the present process, the ice-templated hydrophilic sponge was dried in a vacuum oven at 55-60° C. for about 24 h, after washing with a polar aprotic solvent selected from THF, DMF, acetonitrile, DMSO and the like; preferably THF. To ensure thorough drying, the sponge was taken into two neck RB and kept under vacuum with constant purging of argon. The dry sponge was then incubated in dry chloroform. To this TEA (triethylamine) and excess amount of acid chloride was added and the sponge was stirred at room temperature (25° C.) for about 12 hours under argon atmosphere. After 12 hours, the modified sponge was washed several times with chloroform and tetrahydrofuran.

The macroporous sponge of the present invention have a configuration with the total volume of said macropores ranging between 50-95% of the geometric volume of said polymeric sponge;

The macroporous sponges of the present invention are soft, elastic in nature with the modulus of $10^3$ Pa.

In an embodiment, the present invention provides a process for producing macroporous, omniphilic polymeric sponge, that can absorb both organic fluid of varying polarity as well as water, comprising;
(i) providing ice-templating method comprising of refrigerating the mixture of a PEI in water and 1,4-butanediol diglycidyl ether crosslinker, in the ratio 1 to 1.5 by maintaining the temperature at −15° C. (should be a range: between −3 to −20° C.) for 24 hours until a mesh is observed, thawed to obtain ice-templated hydrophilic cross linked polymeric sponge; and
(ii) covalently coupling the dried polymeric sponge of step (i) with a modifying agent selected from valeroyl chloride in presence of catalytic amount of triethylamine to obtain the desired omniphilic sponge.

In another embodiment, the present invention relates to a process for producing macroporous, omniphilic polymeric sponge, that can absorb both organic fluid of varying polarity as well as water, comprising;
(i) providing ice-templating method comprising of refrigerating the mixture of PVA in water and PEG diepoxide as crosslinker, in the ratio 1 to 1.5, by maintaining the temperature at −15° C. for 24 hours until a mesh is observed, thawed to obtain ice-templated hydrophilic cross linked polymeric sponge; and
(ii) covalently coupling the dried polymeric sponge of step (i) with a modifying agent selected from valeroyl chloride in presence of catalytic amount of triethylamine to obtain the desired omniphilic sponge.

In yet another embodiment, the present invention provides a process for producing macroporous, omniphilic polymeric sponge, that can absorb both organic fluid of varying polarity as well as water, comprising;
(i) providing ice-templating method comprising of refrigerating the mixture of Chitosan dissolved in 1% formic acid solution and glutaraldehyde as crosslinker, in the ratio 1 to 1.5 by maintaining the temperature at −15° C. for 24 hours until a mesh is observed, thawed and reduced with NaBH$_4$ to obtain ice-templated hydrophilic cross linked polymeric sponge; and
(ii) covalently coupling the dried polymeric sponge of step (i) with a modifying agent selected from valeroyl chloride in presence of catalytic amount of triethylamine to obtain the desired omniphilic sponge.

The macroporous sponges of the present invention are elastic in nature with the modulus of $10^3$ Pa with interconnected pores ranging from a few microns to several tens of microns.

In an embodiment, the macroporous polymeric sponges are mechanically stable and can recover completely after large compression to strains of up to 80%. Compression tests were performed for dry sponges as well as sponges that were soaked in solvent (water for $S_O$ and hexane for $S_{C8}$ and $S_{C17}$) as depicted in FIG. 1. The sponges are stable up to about 500 cycles of compression-expansion.

Figure 1A:
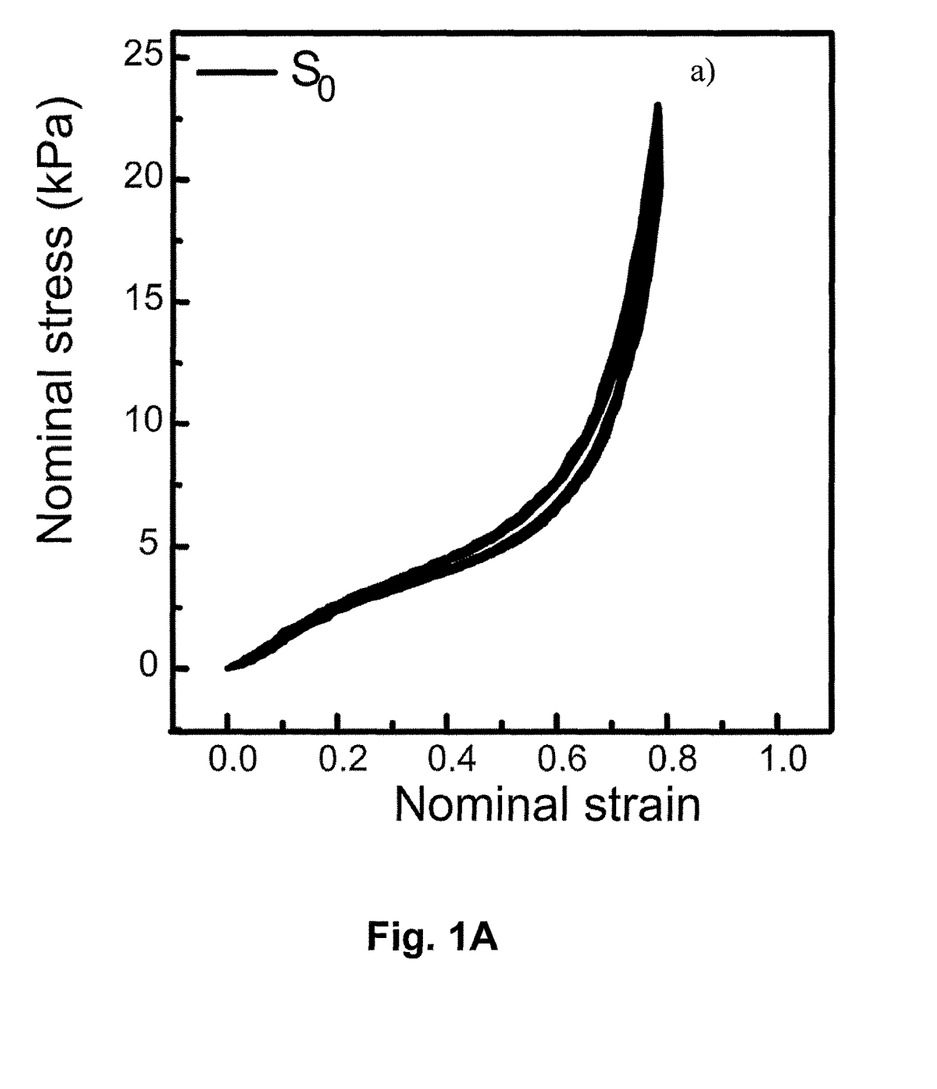
FIGS. 1A, 1B, 1C, and 1D depict multiple compression/expansion cycles of the macroporous polymeric sponge soaked in water and hexane.
Figure 1B:
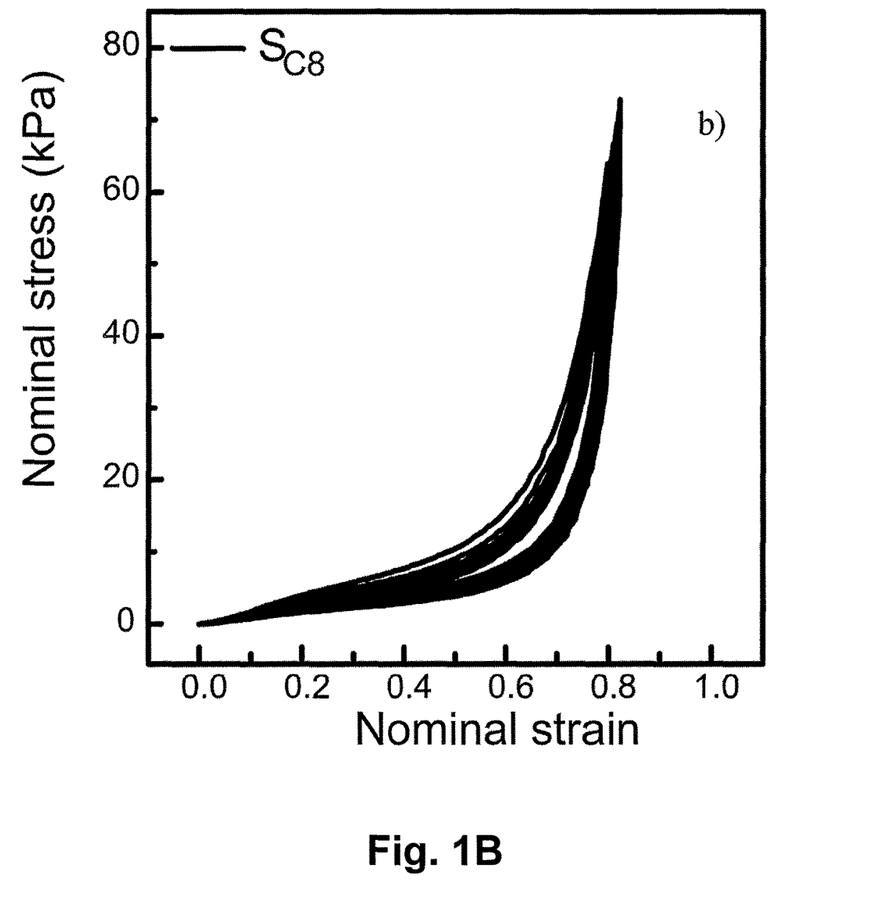
Figure 1C:
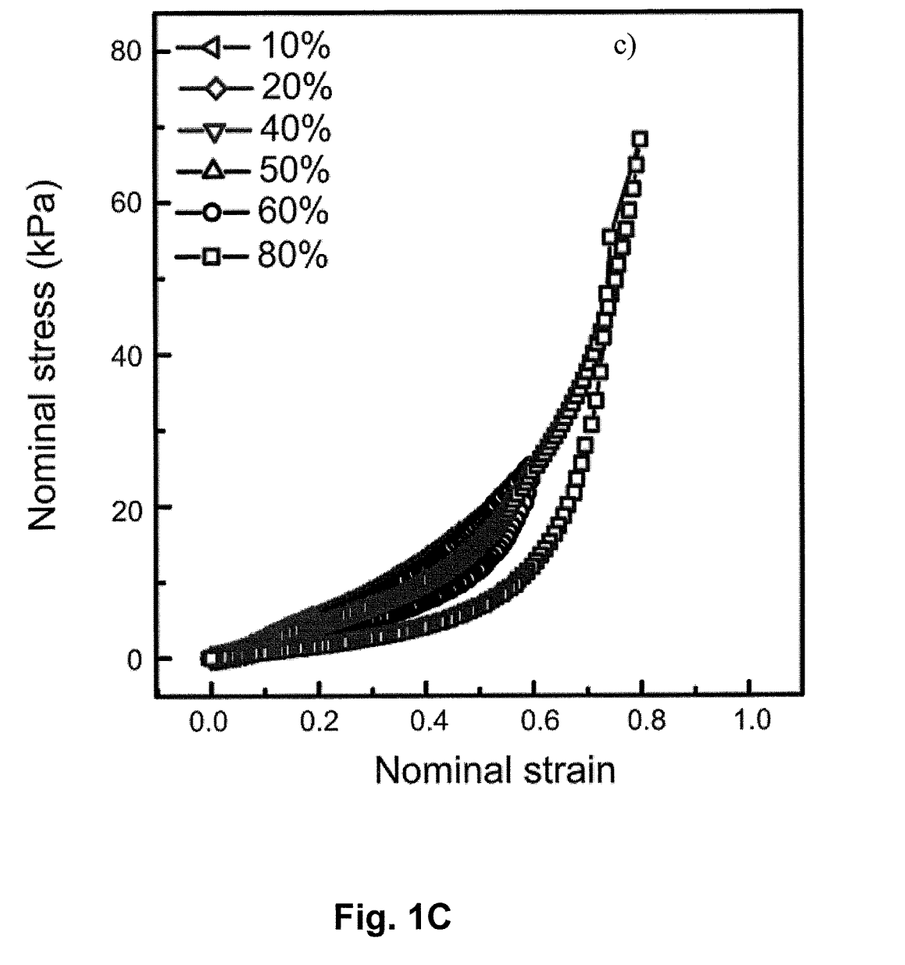
Figure 1D:
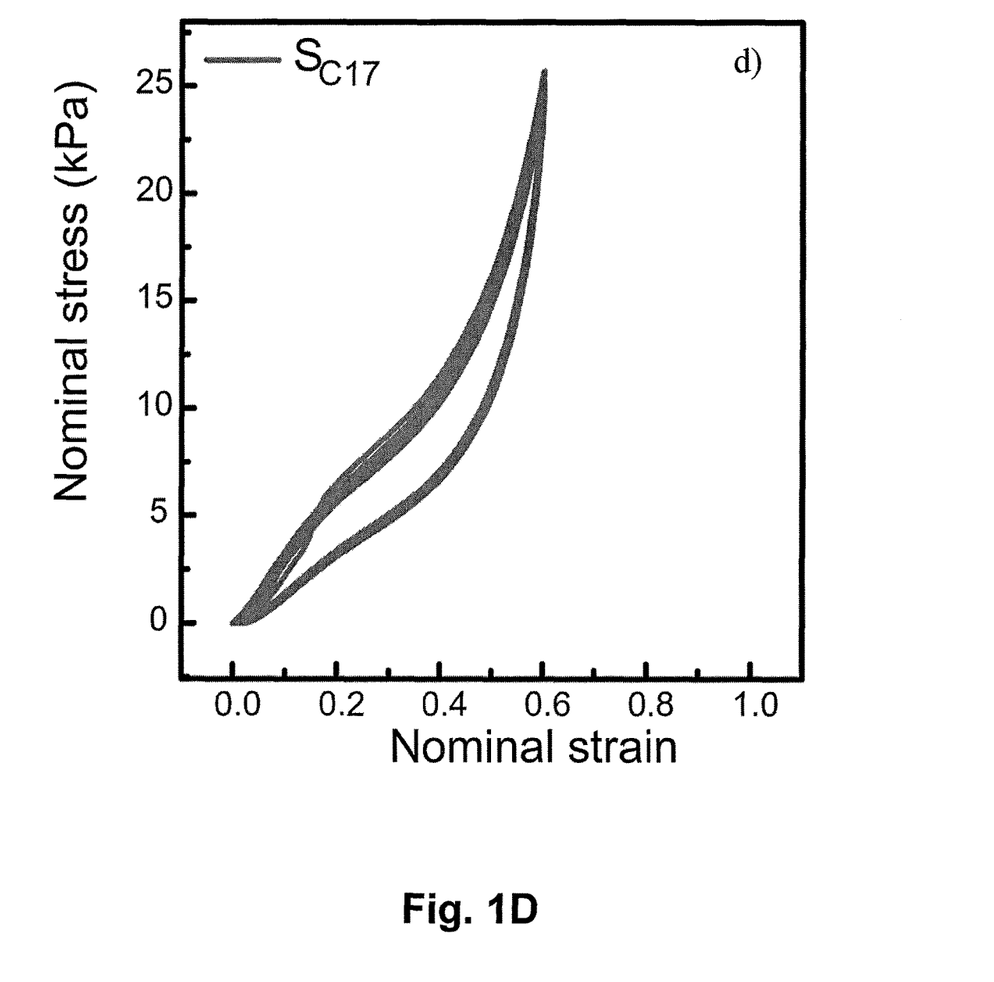
Figure 2A:
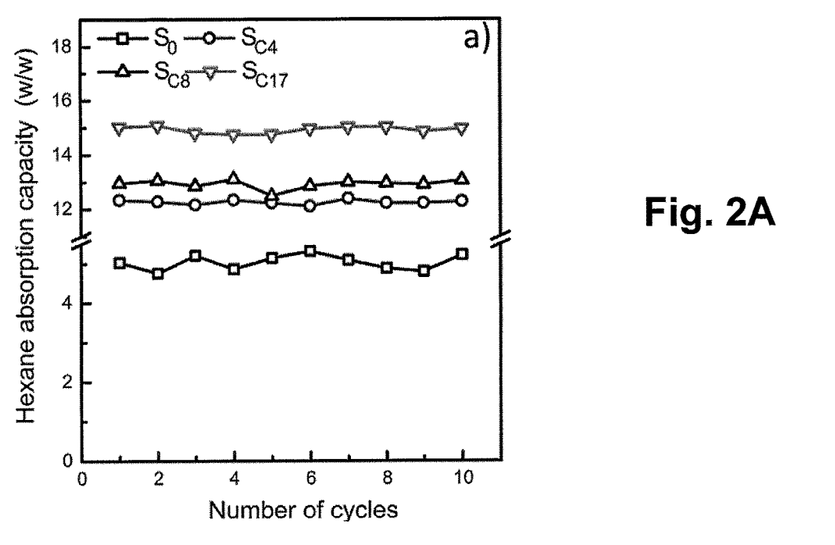
FIGS. 2A and 2B depict mass based absorption capacity of different sponges with a) water b) hexane. The sponge grafted with valeroyl chloride (SC4 in red) shows greater than 10-fold absorption of both (a) water and (b) hexane over multiple cycles.
Figure 2B:
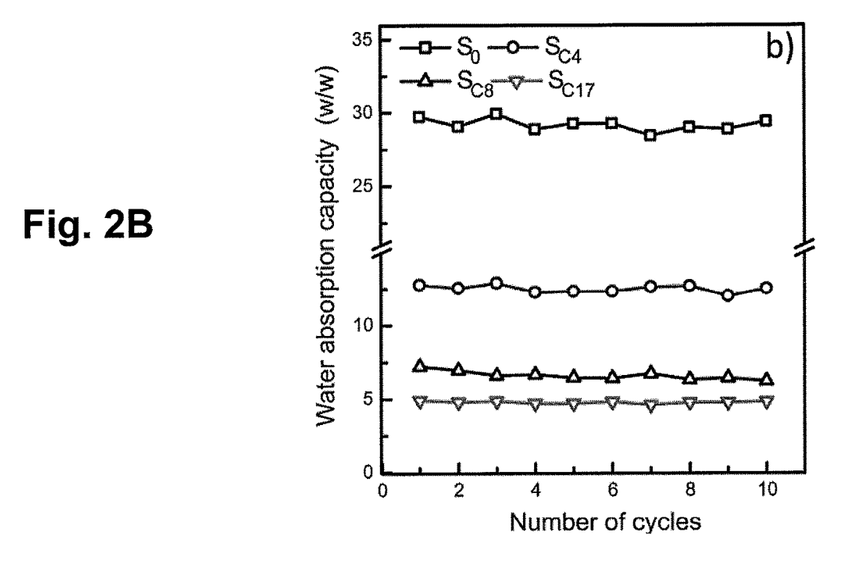

In another embodiment, FIG. 2 depicts the optimized composition of omniphilic sponge comprising PEI, 1,4-butanediol diglycidyl ether and valeroyl chloride (S_C4 in red) that shows greater than 10-fold absorption of both (a) water and (b) hexane over multiple cycles. In another embodiment, the macroporous polymeric sponge of the present invention find utility as absorbents that can selectively absorb water as well as organic fluids such as toluene, hexane, motor oil, soybean oil, hydraulic oil, crude oil and other organic liquids with varying polarity. The sponges can be used to control oil spills in water bodies or in laboratories or in an industrial setting.

EXAMPLE

Following examples are given by way of illustration therefore should not be construed to limit the scope of the invention.

Materials

Polyethylenimine (PEI, supplier specified molecular weight=25 kDa), 1,4-Butanediol diglycidyl ether, Oil Red O Polyvinyl alcohol (PVA, Mw 89-98 kD, 99+% hydrolyzed), chitosan (medium molecular weight), PEG diepoxide (Mn=500 g/mol), valeroyl chloride are obtained are obtained from Sigma Aldrich and are used as received. Distilled deionized water (conductivity 18.2 MΩcm) from a Millipore MilliQ unit is used as solvent to prepare sponges. Valeroyl chloride (termed as C4), nonanoyl chloride (termed C8), palmitoylchloride (termed C17) are obtained from Sigma Aldrich and are used as received, for post treatment of sponges. Triethylamine (TEA) is obtained from Merck (India) and is used without any further purification. Chloroform (HPLC), n-Hexane (AR) are obtained from Thomas-Baker and are dried with molecular sieves before using. Edward's Ultra grade 9 oil is used to examine the absorption capacity kinetics of viscous oil. 10% aqueous dispersion of glutaraldehyde, formic acid, sodium borohydride, triethyl amine (TEA), chloroform and hexane are obtained from Merck.

Example 1

Fabrication of Crosslinked Polymer Sponges by Ice Templating

480 µl water and 12 mg PEI (120 µl of 100 mg/ml stock solution) were mixed by vortexing in a 2 ml flat bottom plastic tube. To this polymer solution, 10 mg of 1,4-butanediol diglycidyl ether was added and mixed thoroughly by vortexing. After mixing, the tube was immediately transferred to a refrigerator and maintained at −15° C. for 24 h until the mesh was observed. Subsequently, the crosslinked PEI sponge was carefully taken out from the plastic tube and allowed to thaw at room temperature. Finally, the sponge was washed multiple times, using excess water. The sponge was referred to as the "as prepared" sponge, $S_0$.

Hydrophobization of $S_0$

The sponge $S_0$ was first dried in a vacuum oven at 55° C. for 24 h, after washing with THF (tetrahydrofuran). To ensure thorough drying, the sponge was taken into a 10 ml two neck RB flask and kept under vacuum with constant purging of argon. The dry sponge was then incubated in 5 ml dry chloroform. To this, 50 µl of TEA (triethylamine) and excess amount of acid chloride (0.6 mmol) were added and, the sponge was stirred at room temperature (25° C.) for 12 hours under argon atmosphere. After 12 hours, the modified sponge was washed several times with chloroform and tetrahydrofuran.

Accordingly, the sponges modified using valeroyl chloride, nonanoylchloride and palmitoyl chloride are named as $S_{C4}$, $S_{C8}$ and $S_{C17}$, respectively.

Characterization:

The morphology of the polymeric sponges was imaged using a Quanta 200 3D scanning electron microscope (SEM). FT-IR measurements were performed using a Bruker instrument in ATR mode, by averaging over 20 scans with a resolution of 4 $cm^{-1}$. Contact angle measurements were performed using a home-built equipment. Absorbance measurements were performed using a UV-spectrometer (Agilent 89090A). Mechanical properties of the sponges were characterized using a rheometer, TA-ARES-G2, equipped with a normal force transducer. Tests were performed by placing sponges between 25 mm roughened parallel plates. The "force gap" tests were performed and measured the normal forces during cyclic compressional loading of the sponges. Nominal compression stress, calculated on the basis of the original diameter of the cylindrical samples (9.1 mm) was reported. Compression tests were performed for dry sponges as well as sponges that were soaked in solvent (water for $S_0$ and hexane for $S_{C8}$ and $S_{C17}$). For tests on solvent-soaked sponges, excess solvent was used in a pool on the bottom plate of the rheometer to eliminate drying of the sample. All mechanical measurements were performed at room temperature (25° C.).

The weight of the sponges were measured before and after the modification and the observation was an increase of 40%, 87% and 122% respectively for $S_{C4}$, $S_{C8}$ and $S_{C17}$, respectively Recyclability Results Sponges were mechanically compressed to remove oil/water and then reused. Mechanical stress-strain data from multiple compression/expansion cycles are provided in the FIG. 1 (a to d). The data shows that for up to 500 cycles of compression there was no deterioration of the sponge. Thus, the versatile macroporous sponge can be reused without deterioration.

Example 2

Preparation of PVA Scaffold:

100 mg PVA is dissolved into 1 ml water by heating at 80° C. until the solution become transparent. 120 µl of 100 mg/ml PVA solution is diluted with 5700 water in a 2 ml plastic tube. 10 µl PEG diepoxide crosslinker is mixed into the aqueous dispersion by vortexing for 2 minutes. The mixture is immediately kept in a freezer at −15° C. for 24 hrs. The scaffold is thawed at room temperature. Subsequently, it is taken out from the tube and washed several time with water.

Preparation of Chitosan Scaffold:

50 mg chitosan is dissolved into 1 ml of 1% formic acid solution by continuous shaking for 12 hr. 200 µl of the chitosan solution is diluted with 80 µl of the formic acid solution. 20 µl of a 10% aqueous dispersion of glutaraldehyde is mixed with the chitosan dispersion and kept at −15° C. for 24 hrs. Subsequently, the crosslinked chitosan monolith is thawed and washed with water. Finally, it is reduced in the presence of sodium borohydride (50 mg in 4 ml water) until the colour changed from brown to white/colourless. The reduced scaffold is washed with water to remove impurities.

Modification of Scaffolds:

Both the aforementioned scaffolds are dried under vacuum for 12 hr. The dry scaffolds are then modified with 40 µl valeroyl chloride in 5 ml chloroform, with catalytic amount of TEA. Acid chloride modified scaffolds are then washed with excess chloroform to remove unreacted acid chloride and TEA. The acid chloride modified scaffolds are then kept inside vacuum oven for drying before measurement of solvent absorption.

Solvent Uptake:

| Scaffold | Weight of hexane/weight of scaffold | Weight of water/weight of scaffold |
|---|---|---|
| PVA | 1.72 | 5.98 |
| Chitosan | 4.53 | 12.13 |

ADVANTAGES OF THE INVENTION

1. A versatile, macroporous, omniphilic polymeric sponge wherein said sponge can absorb both organic liquids of varying polarity as well as water.
2. The invention provides cost effective ice-templating method that allows maintaining the structural morphology of the sponges with interconnected pores ranging from a few microns to several tens of microns.
3. The physical properties and solvophilicity of the ice-templated polymeric sponges can be tuned by covalently grafting different chemical moiety on to the cross linked polymeric sponge.
4. The sponges are mechanically stable and can be reused without deterioration.

We claim:

1. A macroporous omniphilic compressible sponge, wherein said omniphilic compressible sponge is a reaction product of:
   i. a polymer with at least one free amino or hydroxyl group or both;
   ii. a cross-linker; and
   iii. a modifying agent selected from aliphatic or aromatic epoxides, acid chlorides, or aldehydes that tunes the solvophilicity of the sponges;
   wherein the polymer is selected from the group consisting of polyethyleneimine, poly-ε-lysine, and polyvinyl alcohol,
   wherein the polymer and cross linker are in the weight ratio ranging from 1.2:1 to 1.5:1; and
   wherein the total volume of macropores is between 60-95% of the geometric volume of said macroporous omniphilic compressible sponge, said sponge absorbs each of hexane and water individually more than 4 times the weight of the macroporous omniphilic sponge, and said sponge recovers completely after compression to strain of greater than 0% up to and including 80%.

2. The omniphilic compressible sponge according to claim 1, wherein the cross-linker is selected from the group consisting of epichlorohydrin, 1,4-butanediol diglycidyl ether, ethylene glycol diglycidyl ether, polyethylene glycol diglycidyl ether, PEG diepoxide, polypropylene glycol diglycidyl ether, glycerol polyglycidyl ether, sorbitol polyglycidyl ether, aldehyde; 1-Ethyl-3-(3-dimethylamino-propyl)carbodiimide (EDC), N,N'-dicyclohexyl carbodiimide (DCC), N,N'-diisopropylcarbodiitnide (DIC); and isocyanate.

3. The omniphilic compressible sponge according to claim 1, wherein the modifying agent is selected from the group consisting of aromatic and C4 to C17 aliphatic epoxides, acid chlorides, and aldehydes.

4. The omniphilic compressible sponge according to claim 1, wherein the weight ratio of modifying agent: polymer+cross linker is in the range of 1:0.3 to 1.5:1.

5. The omniphilic compressible sponge according to claim 1, wherein said omniphilic compressible sponge is stable to compression-expansion at 500 cycles.

6. A process for producing the macroporous, omniphilic compressible polymeric sponge that can absorb each of hexane and water individually more than 4 times the weight of the macroporous, omniphilic compressible polymeric sponge according to claim 1, comprising:

i. providing an ice-templating method comprising refrigerating a mixture of a polymer with free amino or hydroxyl group in water and a cross-linker by maintaining the temperature at 15° to 20° C. for about 24 hours until a mesh is observed, thawing and drying to obtain an ice-templated hydrophilic cross linked polymeric sponge; and ii. covalently coupling the dried polymeric sponge of step (i) with a modifying agent selected from aliphatic or aromatic acid chlorides, aldehydes, or epoxides to tune the solvophilicity of the sponge to obtain the omniphilic compressible sponge.

7. The macroporous, omniphilic compressible polymeric sponge according to claim 1, wherein the sponge is useful to control oil spills in water bodies, laboratories, or in an industrial setting by selective absorption of organic fluid and water.

* * * * *

UNITED STATES PATENT AND TRADEMARK OFFICE
CERTIFICATE OF CORRECTION

PATENT NO. : 10,487,190 B2
APPLICATION NO. : 14/953811
DATED : November 26, 2019
INVENTOR(S) : Guruswamy Kumaraswamy, Soumyajyoti Chatterjee and Sayam Sen Gupta Page 1 of 1

It is certified that error appears in the above-identified patent and that said Letters Patent is hereby corrected as shown below:

In the Claims

Claim 6, Column 12, Line 9, please change "15°" to -- –15° --.

Claim 6, Column 12, Line 9, please change "20°" to -- –20° --.

Signed and Sealed this
Twenty-eighth Day of April, 2020

Andrei Iancu
*Director of the United States Patent and Trademark Office*